US012612421B2

(12) United States Patent
Murata et al.

(10) Patent No.: US 12,612,421 B2
(45) Date of Patent: Apr. 28, 2026

(54) METHOD FOR PRODUCING 4-BORONO-L-PHENYLALANINE AND INTERMEDIATE THEREOF

(71) Applicant: STELLA PHARMA CORPORATION, Osaka (JP)

(72) Inventors: Yusuke Murata, Osaka (JP); Yoichiro Ohta, Osaka (JP); Hiroshi Takenaka, Osaka (JP); Kensuke Suzuki, Osaka (JP)

(73) Assignee: STELLA PHARMA CORPORATION, Osaka (JP)

( * ) Notice: Subject to any disclaimer, the term of this patent is extended or adjusted under 35 U.S.C. 154(b) by 448 days.

(21) Appl. No.: 18/252,305

(22) PCT Filed: Nov. 8, 2021

(86) PCT No.: PCT/JP2021/040947
§ 371 (c)(1),
(2) Date: May 9, 2023

(87) PCT Pub. No.: WO2022/102565
PCT Pub. Date: May 19, 2022

(65) Prior Publication Data

US 2023/0416280 A1 Dec. 28, 2023

(30) Foreign Application Priority Data

Nov. 13, 2020 (JP) ................................ 2020-189349

(51) Int. Cl.
*C07F 5/02* (2006.01)

(52) U.S. Cl.
CPC .................................. *C07F 5/025* (2013.01)

(58) Field of Classification Search
USPC .......................................................... 560/41
See application file for complete search history.

(56) References Cited

U.S. PATENT DOCUMENTS

| | | | |
|---|---|---|---|
| 5,157,149 | A | 10/1992 | Samsel |
| 6,031,127 | A | 2/2000 | Yamamoto et al. |
| 2013/0331599 | A1 | 12/2013 | Shaw et al. |
| 2018/0155368 | A1 | 6/2018 | Li et al. |

FOREIGN PATENT DOCUMENTS

| | | | |
|---|---|---|---|
| CN | 111741939 | A | 10/2020 |
| CN | 112574245 | A | 3/2021 |
| EP | 2865682 | A1 | 4/2015 |
| EP | 3321272 | A1 | 5/2018 |
| JP | 2000212185 | A | 8/2000 |
| JP | 2008214319 | A | 9/2008 |
| JP | 2018525398 | A | 9/2018 |
| KR | 20180060319 | A | 6/2018 |
| WO | 2019163738 | A1 | 8/2019 |
| WO | 2019219044 | A1 | 11/2019 |

OTHER PUBLICATIONS

Extended European Search Report for European Application No. 21891811.8 dated Nov. 29, 2024.
International Preliminary Report on Patentability for International Application No. PCT/JP2021/040947 dated May 16, 2023, pp. 1-5.
First Office Action with Translation of Japanese Patent Application No. 2022-561897 dated Feb. 26, 2025, pp. 1-6 including English translation.
Wongtha et al., "Boronophenylalanine, a boron delivery agent for boron neutron capture therapy, is transported by ATB0,+, LAT1 and LAT2", Cancer Science, vol. 106, No. 3, pp. 279-286 (Mar. 2015).
Krasovskiy et al., "A LiCl-Mediated Br/Mg Exchange Reaction for the Preparation of Functionalized Aryl- and Heteroarylmagnesium Compounds from Organic Bromides", Angewwandte Chemie Int. Ed, vol. 43, pp. 3333-3336, DOI: 10.1002/anie.200454084 (2004).
Kopp et al., "Halogen-magnesium exchange on unprotected aromatic and heteroaromatic carboxylic acids", ChemComm, pp. 2075-2077 (2007).
Sato, Kentaro, "Development of Turbo Grignard Reagents," Organic Square, vol. 44, pp. 2-24, Partial English Translation provided as pp. 1-11 (2013).
Nakamura et al., "A Practical Method for the Synthesis of Enantiomerically Pure 4-Borono-L-phenylanine", Bull. Chem. Soc. Jpn., vol. 73, pp. 231-235 (2000).
Nakamura et al., "A Concise Synthesis of Enantiomerically Pure L-(4-Boronophenyl)alanine from L-Tyrosine"; J. Org. Chem., vol. 63, pp. 7529-7530 (published on web Sep. 19, 1998).
Malan et al., "A Concise Preparation of 4-Borono-L-phenylalanine (L-BPA) from L-Phenylalanine"; J. Org. Chem., vol. 63, No. 22, pp. 8019-8020 (1998).
Malan et al., "Synthesis of 4-Borono-L-phenylanine", SYNLETT, pp. 167-168 (1966).
Hattori et al., "Development of the first and practical method for enantioselective synthesis of 10 B-enriched p-borono-L-phenylalanine", Tetrahedron Letters, vol. 49, pp. 4977-4980 (2008).
Search Report for International Application No. PCT/JP2021/040947 mailed Jan. 18, 2022 (English translation provided).

(Continued)

*Primary Examiner* — Ana Z Muresan
(74) *Attorney, Agent, or Firm* — EVENTIDE LAW LLC

(57) ABSTRACT

A method for producing 4-borono-L-phenylalanine and its intermediates is provided. The method is for producing a substituted phenyl compound represented by formula (II) from a substituted phenyl compound represented by formula (I). The method comprises a first step in which the compound represented by formula (I) reacts with a linear or branched C1-C10 alkylmagnesium halide in the presence of a metal halide; and a second step in which a boronic acid ester or boronic acid amide reacts with the compound obtained in said first step. The method also can comprise a step of deprotecting the compound of formula (II) obtained in the second step.

9 Claims, No Drawings

(56) References Cited

OTHER PUBLICATIONS

Decision of Reusal issued in corresponding Japanese Application No. 2022-561897 with English translation dated Jun. 26, 2025, pp. 1-4.
First Office Action with Translation of Taiwan Application No. 110142148 dated Jan. 10, 2025.
Office Action issued in corresponding European Patent Application No. 21891811.8, dated Nov. 20, 2025, pp. 1-6.

METHOD FOR PRODUCING 4-BORONO-L-PHENYLALANINE AND INTERMEDIATE THEREOF

TECHNICAL FIELD

The present invention relates to a method for producing 4-borono-L-phenylalanine and an intermediate thereof.

BACKGROUND ART

Boron-neutron capture therapy (BNCT) has attracted attention as a cancer treatment method. Boron neutron capture therapy is a treatment method in which a boron compound containing a boron 10 isotope ($^{10}B$) is incorporated into cancer cells, and a low-energy neutron ray (e.g. thermal neutrons) is applied, so that cancer cells are locally destroyed by a nuclear reaction occurring in the cells. In this treatment method, selective accumulation of a boron compound containing $^{10}B$ in cells of a cancer tissue is important in enhancing the treatment effect, and therefore it is necessary to develop a boron compound that is selectively incorporated into cancer cells.

As a drug that is used for BNCT, a boron-containing compound having a boron atom or a boron atom group introduced into a basic backbone has been synthesized.

Examples of the drug used in clinical practice include 4-borono-L-phenylalanine (L-BPA) and mercaptoundecahydrododecaborate (BSH). 4-borono-L-phenylalanine is incorporated as a mimic of phenylalanine into LAT1 which is a type of amino acid transporter. In cancer cells, expression of LAT1 is increased, and therefore L-BPA is likely to be accumulated. This property is utilized for treatment of cancer (see, for example, Non-Patent Document 1).

As a method for producing 4-borono-L-phenylalanine, a method using boronotoluene as a raw material has been proposed (see Patent Document 1).

PRIOR ART DOCUMENTS

Patent Document

Patent Document 1: JP-A-2008-214319

Non-Patent Document

Non-Patent Document 1: Wongthai P et al., Cancer Sci. 2015 March; 106 (3): 279-86

SUMMARY OF THE INVENTION

Problems to be Solved by the Invention

In the method of Patent Document 1 using boronotoluene as a raw material, among the above-mentioned methods for producing 4-borono-L-phenylalanine containing a boron 10 isotope ($^{10}B$), expensive $^{10}B$ may be lost or by-products may be generated because a multistep process is involved up to the intermediate and L-BPA. Therefore, in production of 4-borono-L-phenylalanine containing a boron 10 isotope ($^{10}B$), there may be room for increasing the yield of a precursor with $^{10}B$ to reduce the amount of by-products by devising a method for producing a raw material and a precursor. There is also room for reducing the amount of by-products in production of 4-borono-L-phenylalanine containing only boron ($^{11}B$) as a boron atom.

An object of the present invention is to provide a new method for producing 4-borono-L-phenylalanine.

Means for Solving the Problems

The present inventors have intensively conducted studies for solving the above-described problems, and resultantly found a new method for synthesizing 4-borono-L-phenylalanine, leading to completion of the present invention.

That is, the present invention provides the following production method.

[1]

A method for producing a compound of formula (II) from a compound of formula (I):

[Formula 1]

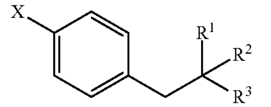

(I)

[Formula 2]

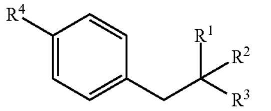

(II)

wherein, in formulas (I) and (II),

X represents Cl, F, Br or I, $R^1$ represents $NR^{11}R^{12}$, $R^{11}$ represents H or a protecting group for an amino group, and $R^{12}$ represents a protecting group for an amino group, $R^2$ represents $COOR^{21}$, and $R^{21}$ represents H, or a linear or branched C1-C10 alkyl group or a benzyl group, $R^3$ represents H or $COOR^{31}$, and $R^{31}$ represents a linear or branched C1-C10 alkyl group or a benzyl group, and $R^4$ represents any of boronic acid ($B(OH)_2$), a boronic acid ester, or a boronic acid amide, the method including:

a first step of reacting the compound of formula (I) with a linear or branched C1-C10 alkylmagnesium halide in the presence of a metal halide; and a second step of reacting the compound obtained in the first step and a boric acid ester or a boric acid amide.

[2]

The production method according to [1], in which the metal halide is lithium chloride, and the alkylmagnesium halide is isopropylmagnesium chloride or sec-butylmagnesium chloride.

[3]

The production method according to [1] or [2], in which X represents Br or I, and $R^3$ is $COOR^{31}$ and $R^{31}$ represents a linear or branched C1-C10 alkyl group.

[4]

The production method according to any one of [1] to [3], in which X represents Br or I, and $R^2$ represents COOH, and $R^3$ represents H.

[5]

The production method according to any one of [1] to [4], in which both the first reaction step and the second reaction step include a step using at least one selected from the group consisting of an ether-based solvent and a hydrocarbon-based solvent as a solvent.

[6]

The production method according to any one of [1] to [5], in which both the first reaction step and the second reaction step are carried out at a reaction temperature in a range of −78° C. to 0° C.

[7]

The production method according to any one of [1] to [6], in which a mixture of a metal halide and an alkylmagnesium halide and a boric acid ester represented by $B(OR)_3$ (R is a linear or branched C1-C10 alkyl group, a phenyl group or a benzyl group) are mixed with the compound of formula (I) to promote the reactions in the first step and the second step.

[8]

The production method according to [7], in which an amount ratio between the mixture of a metal halide and an alkylmagnesium halide and the boric acid ester is 1:0.5 to 2 in terms of equivalent ratio.

[9]

A method for producing 4-borono-L-phenylalanine, the method further including a step of deprotecting the compound of formula (II) obtained in the step according to any one of [1] to [8].

Effect of the Invention

Particularly, in a method for producing 4-borono-L-phenylalanine, a novel production method of the present invention is capable of reducing the amount of by-products to increase the yield of the 4-borono-L-phenylalanine.

MODE FOR CARRYING OUT THE INVENTION

When a compound having asymmetric carbon is mentioned herein, the compound may be any of a racemate, a L-isomer and a D-isomer unless otherwise specified.

When 4-borono-L-phenylalanine or an intermediate (precursor) thereof has a B atom herein, the B atom may contain $^{10}B$ or may include only of $^{11}B$ unless otherwise specified.

In a typical existing method for producing 4-borono-L-phenylalanine, boronotoluene is used as a raw material, and B is added in the initial stage of the production process, so that in particular, when not only $^{11}B$ atoms but also $^{10}B$ atoms are used, expensive $^{10}B$ is lost in a subsequent production process, leading to an increase in production cost. Further, a photo-bromination reaction using light as an active source is involved in synthesis of the precursor. There is a problem that raw material for the bromination reaction is not dissolved in a solvent, and by-products other than an intended compound are generated, leading to a decrease in overall yield.

[Method for Producing Intermediate (Precursor)]

In the present invention, the novel method for producing 4-borono-L-phenylalanine includes the step of producing a compound of formula (II), which is an intermediate of 4-borono-L-phenylalanine, from a compound of formula (I). Herein, the compound of general formula (II) is sometimes referred to as an intermediate or a precursor.

[Formula 3]

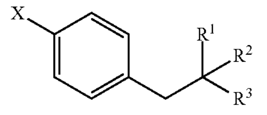

(I)

[Formula 4]

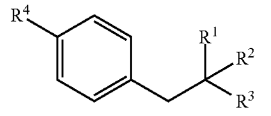

(II)

wherein, in formulas (I) and (II),

X represents Cl, F, Br or I, $R^1$ represents $NR^{11}R^{12}$, $R^{11}$ represents H or a protecting group for an amino group, and $R^{12}$ represents a protecting group for an amino group, $R^2$ represents $COOR^{21}$, and $R^{21}$ represents H, or a linear or branched C1-C10 alkyl group or a benzyl group, $R^3$ represents H or $COOR^{31}$, and $R^{31}$ represents a linear or branched C1-C10 alkyl group or a benzyl group, and $R^4$ represents any of boronic acid ($B(OH)_2$), a boronic acid ester, or a boronic acid amide, the method including:

a first step of reacting the compound of formula (I) with a linear or branched C1-C10 alkylmagnesium halide in the presence of a metal halide; and a second step of reacting the compound obtained in the first step and a boric acid ester or a boric acid amide.

In the production method of the present invention, the protecting group for an amino group may be any group that protects an amino acid, and the protecting group is not particularly limited, and is preferably an acyl-based protecting group, an alkyl protecting group, a carbamate-based protecting group, or the like. Here, examples of the acyl-based protecting group include an acetyl group, a pivaloyl group and a benzoyl group, examples of the alkyl protecting group include a benzyl group, and examples of the carbamate-based protecting group include a tert-butoxycarbonyl group, a benzyloxycarbonyl group and a 9-fluorenylmethyloxycarbonyl group. In the present invention, it is more preferable to use an acyl-based protecting group or a carbamate-based protecting group.

In the production method of the present invention, the boric acid ester or boric acid amide is not particularly limited, and is preferably a compound represented by $B(OR)_3$, $B(NR)_3$, $B(OR)_2(NR)$, $B(OR)(NR)_2$ (R is a linear or branched C1-C10 alkyl group, a phenyl group or a benzyl group). Further, among them, it is particularly preferable to use a compound represented by $B(OR)_3$. Here, the linear or branched C1-C10 alkyl group may be any alkyl group having 1 to 10 carbon atoms, and is preferably a linear or branched C1-C8 alkyl group, more preferably a linear or branched C1-C6 alkyl group. Examples of these groups include, but are not limited to, a methyl group, an ethyl group, an isopropyl group and a butyl group.

The compound of formula (I) can be synthesized, for example, using a commercially available an acetamidomalonic acid diester such as diethyl acetamidomalonate as a starting material. For example, with an alcohol such as ethanol, an ether-based solvent or an aprotic polar solvent such as DMF used as a solvent, a metal alkoxide exemplified by lithium, sodium or the like is added dropwise to prepare an enolate of diester acetamidomalonate. Next, a corresponding halogenated benzyl bromide, for example, 4-iodobenzyl bromide, 4-bromobenzyl bromide, 4-chlorobenzyl bromide or the like is added dropwise to carry out an alkylation reaction. The product can also be obtained by, for example, adjusting the reaction solution to a substantially neutral pH, and performing filtration and drying under reduced pressure when a solid is precipitated. Alternatively, the product can be obtained by extracting a crude product, and then performing purification by column chromatography or the like.

Examples of the more specific and preferred method for producing the compound of formula (I) include the following method. Synthesis is performed using diethyl acetamidomalonate as a starting material. For example, an alcohol such as ethanol is added, and sodium ethoxide is added dropwise to the solution at room temperature. After completion of the dropwise addition, the mixture is stirred under reflux for 30 minutes to 1 hour, and cooled in an ice bath, a halogenated benzyl bromide such as 4-iodobenzyl bromide, 4-bromobenzyl bromide or 4-chlorobenzyl bromide is added, and the mixture is reacted under reflux for 1 hour to 10 hours. The reaction product is cooled in an ice bath, and adjusted to a pH of 6 to 7, and the precipitated solid is filtered, washed, and dried under reduced pressure.

As described above, $R^2$ represents $COOR^{21}$, $R^3$ represents H or $COOR^{31}$, $R^{21}$ represents H or a linear or branched C1-C10 alkyl group or benzyl group, and $R^{31}$ represents a linear or branched C1-C10 alkyl group or benzyl group. Here, the "linear or branched C1-C10 alkyl group" of $R^{21}$ or $R^{31}$ may be any alkyl group having 1 to 10 carbon atoms. A linear or branched C1-C8 alkyl group is preferable, and a linear or branched C1-C6 alkyl group is more preferable. Examples of these groups include, but are not limited to, a methyl group, an ethyl group, an isopropyl group and a butyl group.

In the production method of the present invention, $R^4$ represents a boronic acid ($B(OH)_2$), boronic acid ester or boronic acid amide group, and examples of the boronic acid ester or boronic acid amide group in this definition represent a group having a chain structure like $B(NR^{41})_2$ or $B(OR^{41})_2$ or a cyclic structure together with atom B at the position of $R^4$. Here, $R^{41}$ represents a linear or branched C1-C10 alkyl group. Here, the "linear or branched C1-C10 alkyl group" may be any alkyl group having 1 to 10 carbon atoms as above. A linear or branched C1-C8 alkyl group is preferable, and a linear or branched C1-C6 alkyl group is more preferable. Examples of these groups include, but are not limited to, a methyl group, an ethyl group, an isopropyl group and a butyl group. Further, in the cyclic structure mentioned here, it is not necessarily the case that only O atoms are interposed, and N atoms may be interposed. Examples include, but are not limited to, esters or ester analogs composed of any selected from the group consisting of pinacol, 2,2-dimethyl-1,3-propanediol, N-methyldiethanolamine, 1,8-diaminonaphthalene, N-methyliminodiacetic acid, 1,1,1-trishydroxymethylethane and catechol, and atom B. Examples thereof include, but are not limited to, boronic acid pinacol esters, boronic acid MIDA esters, boronic acid 1,3-propanediol esters, boronic acid neopentyl glycol esters, boronic acid catechol esters, boronic acid pinanediol esters, boronic acid biscyclohexyldiol esters, boronic acid MPM esters, trifluoroborate salts, cyclic triol borate salts, and cyclic forms of diaminonaphthalenamide and boron.

Among them, $R^4$ is particularly preferably boronic acid ($B(OH)_2$) or a boronic acid ester having a chain or cyclic structure, most preferably boronic acid.

In the production method of the present invention, the metal forming a metal halide is preferably an alkali metal such as lithium, sodium, potassium, rubidium or cesium. Examples of the metal halide include lithium halides such as lithium chloride, lithium bromide and lithium iodide, sodium halides such as sodium chloride, sodium bromide and sodium iodide. Among them, lithium chloride is particularly preferably used.

In the production method of the present invention, the alkylmagnesium halide is not particularly limited as long as it contains a linear or branched C1-C10 alkyl group. Here, the linear or branched C1-C10 alkyl group may be any alkyl group having 1 to 10 carbon atoms, and is preferably a linear or branched C1-C8 alkyl group, more preferably a linear or branched C1-C6 alkyl group. Examples of these groups include, but are not limited to, a methyl group, an ethyl group, an isopropyl group and a butyl group. As the alkylmagnesium halide, methylmagnesium chloride, ethylmagnesium chloride, butylmagnesium chloride (e.g. sec-butylmagnesium chloride), hexylmagnesium chloride, isopropylmagnesium chloride, methylmagnesium bromide, ethylmagnesium bromide, butylmagnesium bromide (sec-butylmagnesium bromide etc.), hexylmagnesium bromide, isopropylmagnesium bromide or the like is preferably used.

In the compound, X is not particularly limited, and is preferably a compound represented by Br or I.

It is preferable that $R^2$ is COOH and $R^3$ is H. Further, it is also preferable that $R^2$ is $COOR^{21}$ (wherein $R^{21}$ is a linear or branched C1-C10 alkyl group), and $R^3$ is H.

It is preferable that both the first reaction step and the second reaction step include a step using at least one selected from the group consisting of an ether-based solvent and a hydrocarbon-based solvent as a solvent. A step using at least one selected from the group consisting of an ether-based solvent and a hydrocarbon-based solvent as a solvent is more preferable. Different solvents may be used in the first step and the second step. Here, examples of the ether-based solvent include, but are not limited to, diethyl ether, diisopropyl ether, tetrahydrofuran (THF), 2-methyltetrahydrofuran, dioxane, cyclopentyl methyl ether, glyme and diglyme. Examples of the hydrocarbon-based solvent include, but are not limited to, aromatic hydrocarbon-based solvents such as toluene, xylene and benzene. In the present invention, it is particularly preferable to use tetrahydrofuran or toluene, and these compounds can be used in combination.

Both the first reaction step and the second reaction step are carried out at a reaction temperature in a range of −78° C. to 0° C. The reaction temperature is preferably in the range of −60° C. to 0° C., more preferably in the range of −50° C. to −10° C.

The reaction time in each of the first reaction step and the second reaction step is 10 minutes to 72 hours, more preferably 20 minutes to 60 hours, still more preferably 30 minutes to 48 hours. An interval may be provided between the first reaction step and the second reaction step.

The reaction of the first step and the second step can be promoted by mixing a metal halide/alkylmagnesium halide and a boric acid ester with the compound of formula (I).

The amount ratio between the mixture of a metal halide and an alkylmagnesium halide and the $B(OR)_3$ may be preferably 1:0.5 to 2, more preferably 1:0.7 to 1.5, still more preferably 1:0.8 to 1.3 in terms of equivalent ratio.

The crude product of formula (II) obtained in a step as described above is directly or optionally subjected to extraction, washing and purification steps, and subjected to a subsequent deprotection step.

The extraction, washing and purification steps typically include the following steps.

That is, the reaction product containing the crude product of formula (II) can be optionally subjected to pH adjustment at a temperature of −78° C. or higher, preferably around room temperature (20° C.). As a pH adjuster, an inorganic acid or an organic acid can be used, hydrochloric acid, sulfuric acid, hydrobromic acid, hydroiodic acid or the like can be used as the inorganic acid, and citric acid, acetic acid, trifluoroacetic acid or the like is exemplified as the organic acid. The pH is adjusted to preferably 1 to 5, more preferably 1 to 3.

The reaction mixture can be mixed with an organic solvent, followed by collecting and washing the organic phase. Examples of the organic solvent used here include ester-based solvents such as ethyl acetate, ether-based solvents such as methyl tert-butyl ether, ketones, and halogen-based solvents. The washing can be performed with saline or the like.

This can be dried and filtered to remove impurities, followed by concentrating the filtrate under reduced pressure. Alternatively, an alcohol, an ether-based solvent, a ketone, an aprotic polar solvent, water, a halogen-based solvent or the like can be added to the reaction mixture to precipitate a solid, followed by performing filtration.

Alternatively, water can be added to the organic phase to adjust the organic phase to be basic, followed by transferring the intended product to the aqueous phase and washing the aqueous phase with an organic solvent. Examples of the organic solvent exemplified here include ester-based solvents such as ethyl acetate, ether-based solvents such as methyl tert-butyl ether, alcohol-based solvent such as 1-butyl alcohol or isobutyl alcohol, ketones, and halogen-based solvents. Next, the aqueous phase can be acidified to precipitate a solid, thereby obtaining the intended product.

It is also possible to wash the crude product obtained as described above. The solvent used here for washing is not limited, and examples thereof include ether-based solvents, alcohols, halogen-based solvents, ketones, aprotic polar solvents and water.

The solid obtained as described above can also be dried to obtain the compound of formula (II) with a high purity. The obtained solid can also be recrystallized to further enhance the purity.

Further, the obtained compound of formula (II) can be deprotected to produce 4-borono-L-phenylalanine. The deprotection can be performed by a conventional method, for example, hydrolysis, catalytic hydrogenation or decarboxylation can be performed.

The purification is performed by a conventional method, or can be appropriately modified.

In particular, when the compound is a racemate, the compound can be used as it is, or for example, the optical purity of the L-isomer can be enhanced for obtaining a preferred compound for use in boron neutron capture therapy.

For optical resolution of the L-4 boronophenylalanine derivative, a known method may be appropriately used. It is also possible to employ, for example, a method in which the compound of formula (II) is subjected to a hydrolysis step and an esterification step, followed by performing optical resolution (using α-chymotrypsin or the like), or a simplified method in which the compound of formula (II) is subjected to a hydrolysis step, followed by using acylase.

Alternatively, the step using acylase or the like can be omitted where the compound of formula (II) is a compound in which $R^3$ is H.

As the acylase, commercially available acylase can be used.

The optical resolution treatment using acylase can be performed at a reaction temperature in the range of 30 to 60° C. and a pH in the range of 7.0 to 9.0 for a reaction time of 24 to 60 hours. From the viewpoint of the reaction yield and suppression of impurities, it is preferable to perform the optical resolution at a reaction temperature of 50° C. and a pH of 8.0 for a reaction time of 48 hours.

The method for producing a novel compound according to the present invention is not limited, and particularly preferably provided with the method incorporated in a step of the method for producing 4-borono-L-phenylalanine, particularly in a step of the method for producing 4-borono-L-phenylalanine containing $^{10}B$ as described above.

By using the method of the present invention, such a compound can be obtained with a good yield and in a good state with a high purity. In particular, when the compound contains $^{10}B$, the loss of expensive $^{10}B$ can be reduced, and the method of the present invention can be conveniently used.

The present invention relates to the following production method and specific aspects thereof.

[1]

A method for producing a compound of formula (II) from a compound of formula (I):

[Formula 5]

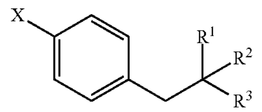

(I)

[Formula 6]

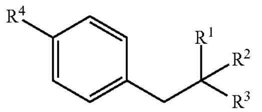

(II)

wherein, in formulas (I) and (II),

X represents Cl, F, Br or I, $R^1$ represents $NR^{11}R^{12}$, $R^{11}$ represents H or a protecting group for an amino group, and $R^{12}$ represents a protecting group for an amino group, $R^2$ represents $COOR^{21}$, and $R^{21}$ represents H, or a linear or branched C1-C10 alkyl group or a benzyl group, $R^3$ represents H or $COOR^{31}$, and $R^{31}$ represents a linear or branched C1-C10 alkyl group or a benzyl group, and $R^4$ represents any of boronic acid ($B(OH)_2$), a boronic acid ester, or a boronic acid amide, the method including:

a first step of reacting the compound of formula (I) with a linear or branched C1-C10 alkylmagnesium halide in the presence of a metal halide; and a second step of reacting the compound obtained in the first step and a boric acid ester or a boric acid amide.

[2]

The production method according to [1], in which the metal halide is lithium chloride, and the alkylmagnesium halide is isopropylmagnesium chloride or sec-butylmagnesium chloride.

[3]

The production method according to [1] or [2], in which X represents Br or I, and $R^3$ is $COOR^{31}$ and $R^{31}$ represents a linear or branched C1-C10 alkyl group.

[4]

The production method according to [1] or [2], in which X represents Br or I, and $R^3$ represents H.

[5]

The production method according to any one of [1] to [4], in which X represents Br or I, and $R^2$ represents $COOR^{21}$, and $R^{21}$ represents H or a methyl group, an ethyl group, an isopropyl group or a butyl group.

[6]

The production method according to any one of [1] to [5], in which $R^4$ is $(B(OH)_2)$.

[7]

The production method according to any one of [1] to [6], in which $R^1$ represents $NR^{11}R^{12}$, $R^{11}$ represents H, butoxycarbonyl or benzyl, and $R^{12}$ represents butoxycarbonyl or benzyl.

[8]

The production method according to any one of [1] to [7], in which X represents Br or I, and $R^2$ represents COOH, and $R^3$ represents H.

[9]

The production method according to any one of [1] to [8], in which both the first reaction step and the second reaction step include a step using at least one selected from the group consisting of an ether-based solvent and a hydrocarbon-based solvent as a solvent.

[10]

The production method according to [9], in which the solvent is tetrahydrofuran, toluene, or a combination thereof.

[11]

The production method according to any one of [1] to [10], in which both the first reaction step and the second reaction step are carried out at a reaction temperature in a range of −78° C. to 0° C.

[12]

The production method according to any one of [1] to [11], in which a mixture of a metal halide and an alkylmagnesium halide and a boric acid ester represented by $B(OR)_3$ (R is a linear or branched C1-C10 alkyl group, a phenyl group or a benzyl group) are mixed with the compound of formula (I) to promote the reactions in the first step and the second step.

[13]

The production method according to any one of [1] to [12], in which the boric acid ester represented by $B(OR)_3$ is triethyl borate or tributyl borate.

[14]

The production method according to [12] or [13], in which an amount ratio between the mixture of a metal halide and an alkylmagnesium halide and the boric acid ester is 1:0.5 to 2 in terms of equivalent ratio.

[15]

The production method according to any one of [1] to [14], in which the B atom in the compound of formula (II) contains $^{10}B$.

[16]

The production method according to any one of [12] to [14], in which the boric acid ester represented by $B(OR)_3$ contains $^{10}B$.

[17]

A method for producing 4-borono-L-phenylalanine, the method further including a step of deprotecting the compound of formula (II) obtained in the step according to any one of [1] to [16].

EXAMPLES

The present invention will be described in more detail by way of examples below, but the present invention is not limited to these examples.

In the following examples, the compounds were analyzed, and separated and purified using the following models and reagents.

NMR spectrum: (JEOL RESONANCE/JNM-ECZ 500 R/500 MHz (Reference Production Example 2) (Examples 2, 4 and 7) (Comparative Example 2)) (JNM-AL Series AL 400/400 MHz manufactured by JEOL Ltd (Comparative Example 1 and Example 1))

As a conventional technique, a comparative example is shown as a method in which boronotoluene is used as a raw material. Reference Production Example 1 is shown in which L-BPA as a final intended product is produced.

Comparative Example 1

(Synthesis of 4-bromomethylphenylboric acid pinacol ester) A solution of 14.2 g (120 mmol) of pinacol and 16.3 g (120 mmol) of 4-methylphenylboric acid in 240 mL of ethyl acetate was heated to reflux at 90° C. for 2 hours. The solution was cooled to 25° C., and diluted by adding 240 mL of n-hexane. Next, a solution of 40.6 g (269 mmol) of sodium bromate in 138 ml of water was added, 278 mL of an aqueous solution of 28.8 g (276 mmol) of sodium bisulfite was added dropwise over 12 minutes with the internal temperature maintained at 35° C. or lower, and the mixture was then stirred at room temperature for 4 hours. 20 mL of ethyl acetate was added to the reaction solution to separate the liquid, the organic phase was washed with a 5% aqueous $Na_2S_2O_3$ solution, and dried over anhydrous magnesium sulfate, and the solvent was then distilled off under reduced pressure. 32.8 g of white powder of a crude product was obtained. The obtained white powder was suspended in 5 mL of hexane, the suspension was washed, then separated by filtration, and dried under reduced pressure to obtain 18.5 g of white powder of a 4-bromomethylphenylboric acid pinacol ester. The yield was 52%.

The obtained white powder was identified by $^1H$-NMR (400 MHz), and confirmed to be a 4-bromomethylphenylboric acid pinacol ester. In the $^1H$-NMR spectrum measurement, deuterated chloroform was used as a solvent, and tetramethylsilane was used as an internal standard substance. The obtained data is shown below.

$^1H$-NMR ($CDCl_3$) δ (ppm): 1.34 (s, 12H), 4.49 (s, 2H), 2.96 (m, 2H), 7.39 (d, 2H, J=8.05 Hz), 7.79 (d, 2H, J=8.05 Hz).

(Synthesis of diethyl 2-acetamide-2-(4,4,5,5-tetramethyl-1,3,2-dioxaborolan-2-yl)benzyl)malonate)

To a solution obtained by diluting 5.10 g (15.0 mmol) of 20% sodium ethoxide with 19.5 mL of ethanol, 3.04 g (14.0 mmol) of diethyl acetamidomalonate was added, and the mixture was stirred at 25° C. for 30 minutes. Next, 2.97 g (10.0 mmol) of the 4-bromomethylphenylboric acid pinacol ester was added, and the mixture was heated to reflux at 100° C. for 12 hours. The solution was cooled to 25° C., and 3.3 mL of 3 N hydrochloric acid was added. Ethanol was distilled off under reduced pressure, and the solution was then diluted with 95 mL of ethyl acetate, and washed with saturated saline. The solution was dried over anhydrous magnesium sulfate, and the solvent was then distilled off under reduced pressure to obtain 4.60 g of orange oil as a crude product. This was subjected to silica gel column chromatography (elution solvent; n-hexane:ethyl acetate=4:1) to obtain 3.45 g of an orange amorphous substance of diethyl 2-acetamide-2-(4,4,5,5-tetramethyl-1,3,2-dioxaborolan-2-yl)benzyl)malonate. The yield was 80%.

The obtained orange amorphous substance was identified by $^1$H-NMR (400 MHz), and confirmed to be diethyl 2-acetamide-2-(4,4,5,5-tetramethyl-1,3,2-dioxaborolan-2-yl)benzyl)malonate. In the $^1$H-NMR spectrum measurement, deuterated chloroform was used as a solvent, and tetramethylsilane was used as an internal standard substance. The obtained data is shown below.

$^1$H-NMR ($CDCl_3$) δ (ppm): 1.30 (t, 6H, J=7.08 Hz), 1.33 (s, 12H), 2.02 (s, 3H), 3.66 (s, 2H), 4.27 (q, 4H, J=7.08 Hz), 6.50 (s, 1H), 7.01 (d, 2H, J=7.81 Hz), 7.70 (d, 2H, J=7.81 Hz).

Reference Production Example 1

Synthesis of 4-(2-acetamide-3-ethoxy-2-(ethoxycarbonyl)-3-oxopropyl)phenylboronic acid To a solution of 0.5 g (1.15 mmol) of the obtained diethyl 2-acetamide-2-(4,4,5,5-tetramethyl-1,3,2-dioxaborolan-2-yl)benzyl)malonate in 40 mL of acetone, 0.74 g (3.45 mmol) of sodium periodate, 0.27 g (3.45 mmol) of ammonium acetate and 20 mL of water were added, and the mixture was stirred at 25° C. for 48 hours. The precipitate was separated by filtration, acetone was distilled off under reduced pressure, and the residue was then diluted with 50 mL of ethyl acetate, and washed with water and saturated saline. The solvent was distilled off under reduced pressure to obtain 0.40 g of white powder of 4-(2-acetamide-3-ethoxy-2-(ethoxycarbonyl)-3-oxopropyl)phenylboronic acid. The yield was 99%.

The obtained white powder was identified by $^1$H-NMR (400 MHz), and confirmed to be 4-(2-acetamide-3-ethoxy-2-(ethoxycarbonyl)-3-oxopropyl)phenylboronic acid. In the $^1$H-NMR spectrum measurement, deuterated chloroform+deuterated methanol was used as a solvent, and tetramethylsilane was used as an internal standard substance. The obtained data is shown below.

$^1$H-NMR ($CDCl_3$+$CD_3OD$) δ (ppm): 1.30 (t, 6H, J=7.08 Hz), 1.92 (s, 2H), 2.02 (s, 3H), 3.64 (s, 2H), 4.21-4.30 (m, 4H), 6.63 (s, 1H), 7.00 (d, 2H, J=7.56 Hz), 7.63 (d, 2H, J=7.56 Hz).

Synthesis of 2-acetamide-3-[4-(dihydroxyboryl)phenyl]propanoic acid 21.6 g (61.7 mmol) of 4-(2-acetamide-3-ethoxy-2-(ethoxycarbonyl)-3-oxopropyl) phenylboronic acid and 179 mL of a 5% aqueous sodium hydroxide solution were stirred at 85.0 to 91.0° C. for 4 hours. The mixture was cooled to 43 to 53° C., 90 mL of 3 N hydrochloric acid was added, and the mixture was further stirred at 85.0 to 90.0° C. for 1 hour. The mixture was cooled to 45° C., and the reaction solution was concentrated under reduced pressure. 32 mL of water was added to the residue, the mixture was stirred at 20° C. for 30 minutes, and the precipitated crystals were filtered, and washed with 20 mL of water. The crystals were dried under reduced pressure at 45° C. to obtain 11.5 g of white powder of 2-acetamide-3-[4-(dihydroxyboryl)phenyl]propanoic acid. The yield was 74.6%.

The obtained white powder was identified by $^1$H-NMR (400 MHz), and confirmed to be 2-acetamide-3-[4-(dihydroxyboryl)phenyl]propanoic acid. In the $^1$H-NMR spectrum measurement, deuterated methanol was used as a solvent, and methanol was used as an internal standard substance. The obtained data is shown below.

$^1$H-NMR ($CD_3OD$) δ (ppm): 1.87 (s, 3H), 2.92 (dd, 2H, J=13.7, 8.30 Hz), 3.20 (dd, 2H, J=13.7, 4.64 Hz), 4.53 (dd, 1H, J=8.30, 4.64 Hz), 7.20 (d, 2H, J=7.56 Hz), 7.59 (br. s, 2H).

Synthesis of (2S)-2-amino-3-[4-(dihydroxyboryl)phenyl]propanoic acid 1.84 g (46.0 mmol) of sodium hydroxide was dissolved in 58 mL of water, 11.5 g (46.0 mmol) of 2-acetamide-3-[4-(dihydroxyboryl)phenyl]propanoic acid was added at 50° C., and the mixture was stirred. Concentrated hydrochloric acid was added to this solution to adjust the pH to 8.0, 0.575 g of acylase (Acylase “Amano” manufactured by Amano Enzyme inc.) was added, and the mixture was stirred. Stirring was performed at 50° C. for 48 hours while the pH of the reaction solution was adjusted to 8.0 by adding concentrated hydrochloric acid. The reaction solution was cooled to 25° C., and concentrated hydrochloric acid was added to adjust the pH to 6.4. The mixture was left standing at 5° C. for 1 hour, and then diluted by adding 23 mL of water, and the precipitated crystals were filtered and washed with 23 mL of water and 12 mL of ethanol. The crystals were dried under reduced pressure at 45° C. to obtain 4.54 g of white powder of (2S)-2-amino-3-[4-(dihydroxyboryl)phenyl]propanoic acid. The yield was 47.5%.

The obtained white powder was identified by $^1$H-NMR (400 MHz), and confirmed to be (2S)-2-amino-3-[4-(dihydroxyboryl-10B)phenyl]propanoic acid. In the $^1$H-NMR spectrum measurement, deuterated water+deuterated hydrochloric acid was used as a solvent, and sodium 3-trimethylsilylpropionate-d4 (TSP) was used as an internal standard substance. The obtained data is shown below.

$^1$H-NMR ($D_2O$+DCl) δ (ppm): 3.27 (dd, 1H, J=14.8, 7.6 Hz), 3.40 (dd, 1H, J=14.8, 6.0 Hz), 4.42 (dd, 1H, J=7.6, 6.0 Hz), 7.38 (d, 2H, J=8.0 Hz), 7.77 (d, 2H, J=8.0 Hz).

Further, the optical purity of the obtained (2S)-2-amino-3-[4-(dihydroxyboryl)phenyl]propanoic acid was confirmed by HPLC analysis. For the HPLC measurement, CROWN PAK CR (+) (mobile phase: 60% $HClO_4/H_2O$=12/3000, detector wavelength: 223 nm, column temperature: 25° C.) manufactured by Daicel Chemical Industries, Ltd. was used as an HPLC column to perform analysis. The obtained (2S)-2-amino-3-[4-(dihydroxyboryl)phenyl]propanoic acid was analyzed with the apparatus adjusted so that the retention time of (2R)-2-amino-3-[4-(dihydroxyboryl)phenyl]propanoic acid was about 6.7 minutes when the retention time of (2S)-2-amino-3-[4-(dihydroxyboryl)phenyl]propanoic acid was about 9.7 minutes. The result showed that a peak was not observed at about 6.7 minutes, and thus the optical purity was 99.9% e. e. or more.

It was shown that in this method, a product having an optical purity of 99.9% e. e. or more was obtained, whereas in the production of the compound obtained by the method of Comparative Example 1, the loss of B atoms was very large.

Next, a reference production example and examples will be shown as an embodiment of the present invention.

Reference Production Example 2

Production of diethyl 2-acetamide-2-(4-iodobenzyl)malonate Ethanol (75 mL) was added to diethyl acetamidomalonate (10.0 g, 46.0 mmol) to obtain a solution (0.6 M). To this solution, sodium ethoxide (20% ethanol solution, 18.8 g, 55.2 mmol) was added dropwise at room temperature over 20 minutes. After completion of the dropwise addition, the mixture was stirred under reflux for 45 minutes, and then cooled in an ice bath, 4-iodobenzyl bromide (15.0 g, 50.5 mmol) was added, and the mixture was reacted under reflux for 4 hours. The reaction product was cooled in an ice bath, 2 N hydrochloric acid was added dropwise to adjust the pH to 6 to 7, and the precipitated solid was filtered. The obtained solid was washed with water and hexane in this order, and dried under reduced pressure to obtain diethyl 2-acetamide-2-(4-iodobenzyl)malonate (15.1 g, 34.9 mmol, 75%) as a yellow solid.

$^1$H NMR (500 MHz, $CDCl_3$): δ 7.59 (d, J=5.0 Hz, 2H, ArH), 6.75 (d, J=5.0 Hz, 2H, ArH), 4.27 (q, J=5.0 Hz, 4H, $CH_2$), 3.59 (s, 2H, $CH_2$), 2.03 (s, 3H, $CH_3$), 1.30 (t, J=5.0 Hz, 6H, $CH_3$).

Example 1

(Production of (4-(2-acetamide-3-ethoxy-2-(ethoxycarbonyl)-3-oxopropyl)phenyl)boronic acid

[Formula 7]

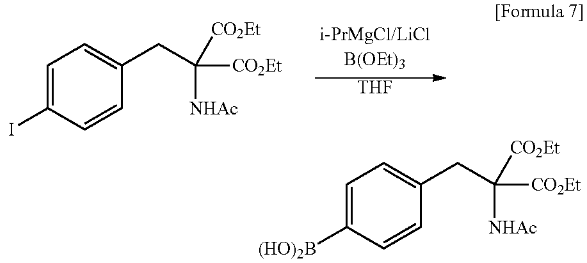

To the diethyl 2-acetamide-2-(4-iodobenzyl)malonate (433 mg, 1.00 mmol) obtained in Reference Production Example 2, anhydrous tetrahydrofuran (2.0 mL) was added in a nitrogen atmosphere to obtain a solution (0.5 M). To this solution, an isopropylmagnesium chloride-lithium chloride complex (1.29 M tetrahydrofuran solution, 2.2 eq., 1.7 mL, 2.2 mmol) was added dropwise at −20° C. The mixture was stirred at the same temperature for 30 minutes, and triethyl borate (1.3 eq., 0.22 mL, 1.3 mmol) was then added dropwise at −20° C. The mixture was stirred at the same temperature for 21.5 hours, and 1 M hydrochloric acid was then added at room temperature to adjust the pH to about 3. Ethyl acetate (50 mL×2) was added to the reaction mixture, the mixture was extracted, and the organic phase was then washed with saturated saline (30 mL). To this, anhydrous sodium sulfate was added, the mixture was dried and filtered, and the filtrate was concentrated under reduced pressure. The obtained crude product was filtered through a membrane with diisopropyl ether (about 50 mL) used as a washing solvent, and the filtered product was washed with diisopropyl ether (about 50 mL). The obtained solid was dried under reduced pressure to obtain (4-(2-acetamide-3-ethoxy-2-(ethoxycarbonyl)-3-oxopropyl)phenyl)boronic acid (256 mg, 0.729 mmol, 73%) as a white solid.

$^1$H NMR (400 MHz, DMSO-$d_6$): 7.96 (s, 2H, OH), 7.68 (d, J=8.0 Hz, 2H, ArH), 6.94 (d, J=8.0 Hz, 2H, ArH), 4.15 (q, J=8.0 Hz, 4H, $CH_2$), 3.43 (s, 1H, NH), 1.94 (s, 3H, $CH_3$), 1.17 (t, J=8.0 Hz, 6H, $CH_3$).

In the method of the example, the yield after use of the boric acid ester was about 70%, and even when diethyl 2-acetamide-2-(4-iodobenzyl)malonate was reacted with the boric acid ester in an amount equal to or greater than the equivalent (1.3 equivalents), the loss of the used B atoms was suppressed. Thus, this method was confirmed to be an excellent method. It is also possible to further suppress the loss of $^{10}$B atoms by further adjusting the amount of the boric acid ester.

With the 4-(2-acetamide-3 ethoxy-2-(ethoxycarbonyl)-3 oxopropyl) phenylboronic acid obtained in Example 1, (2S)-2-amino-3-[4-(dihydroxyboryl)phenyl]propanoic acid can be finally obtained by a conventional method. Specifically, the same method as in Reference Production Example 1 can also be employed.

Example 2

Production of (S)-(4-(3-tert-butoxy)-2-((tert-butoxycarbonyl)amino)-3-oxopropyl)phenyl)boronic acid

[Formula 8]

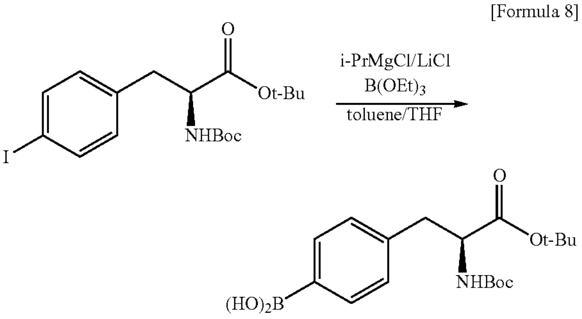

To tert-butyl (S)-2-((tert-butoxycarbonyl)amino)-3-(4-iodophenyl)propanoate (6.71 g, 15.0 mmol), a mixed solution of anhydrous toluene/anhydrous tetrahydrofuran (1/1, 75 mL) was added in a nitrogen atmosphere. To this solution, an isopropylmagnesium chloride-lithium chloride complex (1.3 M tetrahydrofuran solution, 24 mL, 32 mmol) was added dropwise at −20° C. over 30 minutes. The mixture was stirred at the same temperature for 5 hours, and tributyl borate (3.80 g, 16.5 mmol) was added dropwise over 10 minutes. The mixture was stirred for 17 hours, and 3% hydrochloric acid was then added at 10° C. or lower to stop the reaction and adjust the pH to about 1. The reaction mixture was concentrated under reduced pressure to distill off tetrahydrofuran, and ethyl acetate (50 mL×2) was then added, the mixture was extracted, and the organic phase was washed with saturated saline (30 mL). To this, anhydrous sodium sulfate was added, the mixture was dried and filtered, and the filtrate was concentrated under reduced pressure. A crude product (6.74 g) was obtained as light yellow oily material, and directly used for the next step.

$^1$H NMR (500 MHz, DMSO-$d_6$): δ 7.95 (s, 2H, OH), 7.69 (d, J=10.0 Hz, 2H, ArH), 7.18 (d, J=10.0 Hz, 2H, ArH), 7.14

(d, J=5.0 Hz, 1H, NH), 4.02 (m, 1H, CH), 2.93 (dd, J=5.0, 15.0 Hz, 1H, $CH_2$), 2.84 (dd, J=10.0, 15.0 Hz, 1H, $CH_2$), 1.34 (s, 18H, $CH_3$).

Example 3

Production of (2S)-2-amino-3-[4-(dihydroxyboryl)phenyl]propanoic acid

[Formula 9]

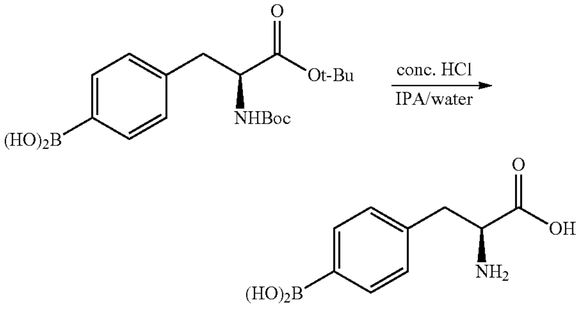

To the (S)-(4-(3-tert-butoxy)-2-((tert-butoxycarbonyl)amino)-3-oxopropyl)phenyl)boronic acid (6.74 g) obtained in Example 2, isopropyl alcohol water (1/4, 30 mL) was added. To this solution, concentrated hydrochloric acid (15.6 g, 150 mmol) was added. The mixture was stirred at 55° C. for 4 hours, and then cooled to room temperature, and water (50 mL) was added, and the mixture was washed with ethyl acetate (50 mL). To the obtained aqueous phase, an aqueous sodium hydroxide solution was added dropwise to adjust the pH to 6.2, so that a solid was precipitated. The precipitate was filtered, washed with water (50 mL) and acetone (50 mL) in this order, and then dried under reduced pressure to obtain (2S)-2-amino-3-[4-(dihydroxyboryl)phenyl]propanoic acid (2.35 g, 11.2 mmol, 75% for 2 steps, 98% ee) as a white solid.

$^1H$ NMR ($D_2O$+DCl): 7.77 (d, J=8.0 Hz, 2H, ArH), 7.38 (d, J=8.0 Hz, 2H, ArH), 4.42 (dd, J=6.0, 7.6 Hz, 1H, CH), 3.40 (dd, J=6.0, 14.8 Hz, 1H, $CH_2$), 3.27 (dd, J=7.6, 14.8 Hz, 1H, $CH_2$).

By using a compound obtained as in Example 2, (2S)-2-amino-3-[4-(dihydroxyboryl)phenyl]propanoic acid can be obtained with a high yield without passing through the step of optical resolution. That is, it is possible to obtain a final optically active material without using an enzyme like acylase. Only 1.1 equivalents of tributyl borate was not used. It is also possible to further suppress the loss of $^{10}B$ atoms.

Example 4

Production of (S)-(4-(2-(bis(tert-butoxycarbonyl)amino)-3-(tert-butoxy)-3-oxopropyl)phenyl)boronic acid

[Formula 10]

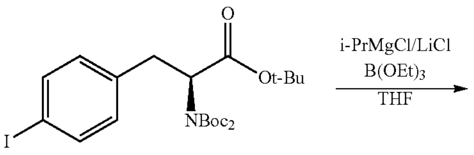

-continued

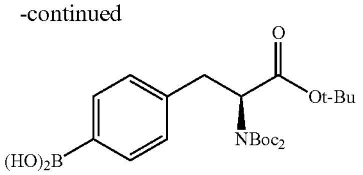

To tert-butyl (S)-2-(bis(tert-butoxycarbonyl)amino)-3-(4-iodophenyl)propanoate (566 mg, 1.03 mmol), anhydrous tetrahydrofuran (2.1 mL) was added in a nitrogen atmosphere. To this solution, an isopropylmagnesium chloride-lithium chloride complex (1.29 M tetrahydrofuran solution, 1.0 mL, 1.2 mmol) was added dropwise at −20° C. over 5 minutes. The mixture was stirred at the same temperature for 30 minutes, and tributyl borate (195 mg, 1.34 mmol) was then added dropwise. The mixture was stirred for 16 hours, and 3% hydrochloric acid was then added at 10° C. or lower to stop the reaction and adjust the pH to about 5. Ethyl acetate (50 mL×2) was added to the reaction mixture, the mixture was extracted, and the organic phase was washed with saturated saline (30 mL). To this, anhydrous sodium sulfate was added, the mixture was dried and filtered, and the filtrate was concentrated under reduced pressure. The obtained crude product was purified by silica gel column chromatography (hexane/ethyl acetate=1/1 to 1/2) to obtain (S)-(4-(2-(bis(tert-butoxycarbonyl)amino)-3-(tert-butoxy)-3-oxopropyl)phenyl)boronic acid (397 mg, 0.852 mmol, 83%) as a colorless oily material.

$^1H$ NMR (500 MHz, $CDCl_3$): δ 7.58 (dd, J=5.0, 10.0 Hz, 2H, ArH), 6.93 (dd, J=5.0, 10.0 Hz, 2H, ArH), 5.00 (dd, J=5.0, 10.0 Hz, 1H, CH), 3.33 (dd, J=5.0, 15.0 Hz, 1H, $CH_2$), 3.15 (dd, J=10.0, 15.0 Hz, 1H, $CH_2$), 1.47 (s, 9H, $CH_3$), 1.42 (s, 18H, $CH_3$).

Example 5

Production of (2S)-2-amino-3-[4-(dihydroxyboryl)phenyl]propanoic acid

[Formula 11]

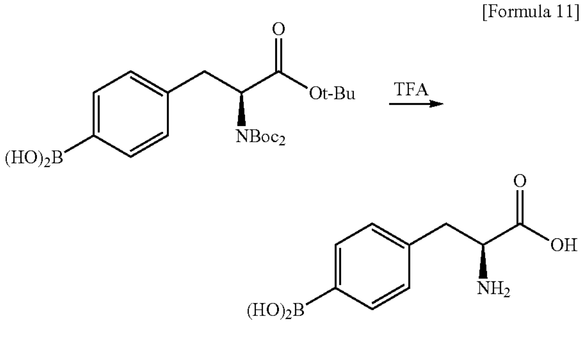

To the (S)-(4-(2-(bis(tert-butoxycarbonyl)amino)-3-(tert-butoxy)-3-oxopropyl)phenyl)boronic acid (590 mg, 1.27 mmol), trifluoroacetic acid (4.34 g, 38.1 mmol) was added at room temperature. The mixture was stirred for 22 hours, and then concentrated under reduced pressure to distill off the trifluoroacetic acid. Toluene (50 mL) was added, and the operation of concentration under reduced pressure was further carried out three times to distill off the trifluoroacetic acid almost completely. The obtained solid was filtered with dichloromethane (50 mL) used as a washing solvent, and was dried under reduced pressure at 50° C. to obtain a trifluoroacetic acid salt of (2S)-2-amino-3-[4-(dihydroxyboryl)phenyl]propanoic acid (359 mg, 1.11 mmol, 88%) as a white solid.

$^1H$ NMR (500 MHz, $D_2O$): δ 7.77 (d, J=10.0 Hz, 2H, ArH), 7.37 (d, J=10.0 Hz, 2H, ArH), 4.34 (dd, J=5.0, 10.0 Hz, 1H, CH), 3.38 (dd, J=5.0, 15.0 Hz, 1H, $CH_2$), 3.25 (dd, J=10.0, 15.0 Hz, 1H, $CH_2$).

Comparative Example 2

Production of (S)-(4-(3-(benzyloxy)-2-(dibenzylamino)-3-oxopropyl)phenyl)boronic acid

[Formula 12]

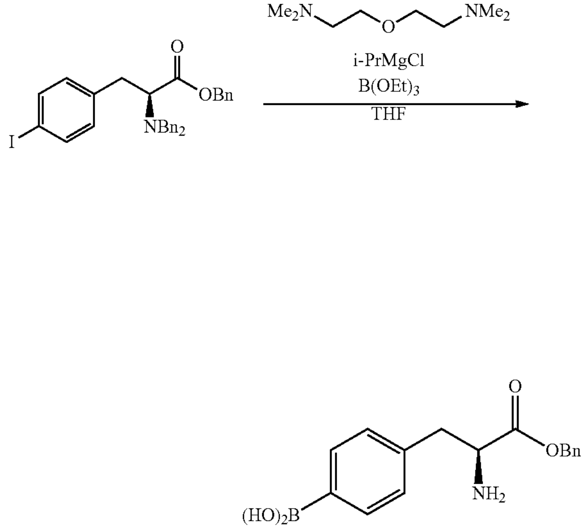

To bis(2-dimethylaminoethyl)ether (394 mg, 2.46 mmol), tetrahydrofuran (1.1 mL) was added in a nitrogen atmosphere, and isopropylmagnesium chloride (0.9 M tetrahydrofuran solution, 2.7 mL, 2.5 mmol) was then added in an ice bath. A solution (3.0 mL) of benzyl (S)-2-(dibenzylamino)-3-(4-iodophenyl)propanoate (1.15 g, 2.05 mmol) in tetrahydrofuran was added with the temperature adjusted to 0 to 5° C. The mixture was stirred for 1 hour, and then cooled to −20° C., and triethyl borate (449 mg, 3.08 mmol) was added. The mixture was heated to room temperature, and stirred for 24 hours, 3% hydrochloric acid was then added to stop the reaction, and a 4% aqueous sodium hydroxide solution was added to adjust the pH to 7. Ethyl acetate (30 mL) was added, the mixture was extracted twice, and the organic phase was then washed with saturated saline (30 mL). This was dried over anhydrous sodium sulfate, and filtered, and the obtained filtrate was then concentrated under reduced pressure. The obtained crude product was purified by silica gel column chromatography (hexane/ethyl acetate=1/1) to obtain (S)-(4-(3-(benzyloxy)-2-(dibenzylamino)-3-oxopropyl)phenyl)boronic acid (490 mg, 1.02 mmol, 50%) as a colorless oily material. $^1H$ NMR (500 MHz, $CDCl_3$): δ 8.10 (s, 2H, OH), 7.40-7.12 (m, 19H, ArH), 5.26 (d, J=15.0 Hz, 1H, $CH_2$), 5.15 (d, J=15.0 Hz, 1H, $CH_2$), 3.96 (d, J=15.0 Hz, 2H, $CH_2$), 3.80 (t, J=5.0 Hz, 1H, CH), 3.57 (d, J=15.0 Hz, 2H, $CH_2$), 3.23 (dd, J=5.0, 15.0 Hz, 1H, $CH_2$), 3.11 (d, J=5.0, 15.0 Hz, 1H, $CH_2$).

Example 6

Production of (S)-(4-(3-(benzyloxy)-2-(dibenzylamino)-3-oxopropyl)phenyl)boronic acid

[Formula 13]

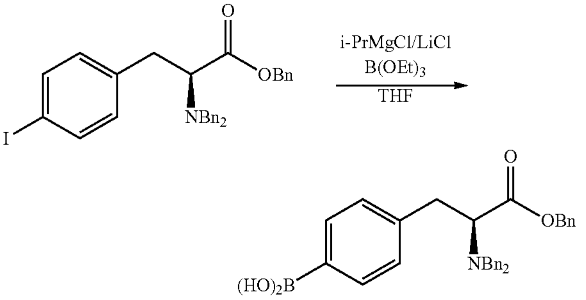

A solution (4.0 mL) of benzyl (S)-2-(dibenzylamino)-3-(4-iodophenyl)propanoate (1.12 g, 2.00 mmol) in tetrahydrofuran was added in a nitrogen atmosphere. The mixture was cooled to −20° C., and an isopropylmagnesium chloride-lithium chloride complex (1.29 M tetrahydrofuran solution, 1.9 mL, 2.4 mmol) was added dropwise. The mixture was stirred at the same temperature for 30 minutes, and triethyl borate (436 mg, 2.99 mmol) was then added dropwise. The mixture was stirred for 16 hours, 3% hydrochloric acid was then added to stop the reaction, and a 4% aqueous sodium hydroxide solution was added to adjust the pH to 7. Ethyl acetate (30 mL) was added, the mixture was extracted twice, and the organic phase was then washed with saturated saline (30 mL). This was dried over anhydrous sodium sulfate, and filtered, and the obtained filtrate was then concentrated under reduced pressure. The obtained crude product was purified by silica gel column chromatography (hexane/ethyl acetate=1/1) to obtain (S)-(4-(3-(benzyloxy)-2-(dibenzylamino)-3-oxopropyl)phenyl)boronic acid (750 mg, 1.56 mmol, 79%) as a colorless oily material.

By comparing Example 6 with Comparative Example 2, it was confirmed that in Example 6, less reaction time was required in both the halogen/magnesium exchange reaction and the borylation reaction, and a higher yield was obtained. The technique of the example was shown to be superior in terms of time and yield.

Example 7

Production of (S)-3-(4-boronophenyl)-2-((tert-butoxycarbonyl)amino)propanoic acid

[Formula 14]

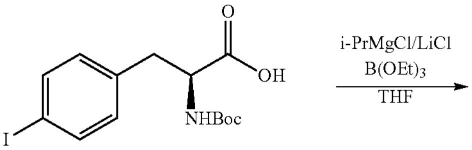

-continued

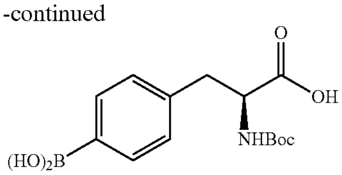

To (S)-2-((tert-butoxycarbonyl)amino)-3-(4-iodophenyl) propanoic acid (3.13 g, 8.00 mmol), anhydrous tetrahydrofuran (8.0 mL) was added in a nitrogen atmosphere. The mixture was cooled to −30° C., and an isopropylmagnesium chloride-lithium chloride complex (1.3 M tetrahydrofuran solution, 25 mL, 32 mmol) was added dropwise over 15 minutes. The mixture was stirred for 4 hours, and tributyl borate (1.84 g, 8.00 mmol) was then added dropwise at the same temperature. The mixture was stirred for 1.5 hours, and 3% hydrochloric acid (20 mL) was then added at 10° C. or lower. Subsequently, concentrated hydrochloric acid was added dropwise at 10° C. or lower to adjust the pH to 1. Ethyl acetate (30 mL×2) was added, the mixture was extracted, and the organic phase was then washed with saturated saline (30 mL). This was dried over anhydrous sodium sulfate, and filtered, and the obtained filtrate was then concentrated under reduced pressure. To the obtained crude product, dichloromethane (100 mL) was added to precipitate a solid, and the precipitate was then filtered, and washed with dichloromethane (50 mL). A solid was obtained, precipitation of a solid in the filtrate was confirmed, and the filtrate was further filtered. This operation was carried out twice, and the obtained solid was dried under reduced pressure at 60° C. to obtain (S)-3-(4-boronophenyl)-2-((tert-butoxycarbonyl)amino)propanoic acid (1.84 g, 5.95 mmol, 74%) as a white solid.

$^{1}H$ NMR (500 MHz, acetone-$d_6$): δ 7.81 (d, J=10.0 Hz, 2H, ArH), 7.28 (d, J=10.0 Hz, 2H, ArH), 7.11 (brs, 1H, OH), 6.01 (d, J=10.0 Hz, 1H, NH), 4.45 (m, 1H, CH), 3.22 (dd, J=5.0, 15.0 Hz, 1H, $CH_2$), 3.03 (dd, J=10.0, 15.0 Hz, 1H, $CH_2$), 1.36 (s, 9H, $CH_3$).

It was confirmed that even when the amount of tributyl borate was 1.0 equivalent, an intended product was obtained with a yield of 74%, and it was possible to produce a state in which the loss of expensive $^{10}B$ was extremely small.

Comparative Example 3

In a nitrogen atmosphere, (S)-2-((tert-butoxycarbonyl) amino)-3-(4-iodophenyl)propanoic acid (1.18 g, 3.02 mmol) was added to sodium hydride (60% oil suspension, 121 mg, 3.02 mmol) and tributyl borate (2.09 g, 9.06 mmol). In an ice bath, tert-butylmagnesium chloride (0.88 M tetrahydrofuran solution, 27 mL, 24 mmol) was added dropwise at 20° C. or lower over 10 minutes. The mixture was heated to room temperature, and stirred for 24 hours, and 3% hydrochloric acid was then added in an ice bath to stop the reaction and adjust the pH to 1. Tert-butylmethyl ether (30 mL) was added, the mixture was extracted twice, and the organic phase was then washed with saturated saline (30 mL). This was dried over anhydrous sodium sulfate, and filtered, and the obtained filtrate was then concentrated under reduced pressure. $^{1}H$ NMR measurement of the obtained crude product was performed, and the result showed that most of the crude product was the recovered raw material.

Example 8

Production of (S)-2-amino-3-(4-boronophenyl)propanoic acid

[Formula 15]

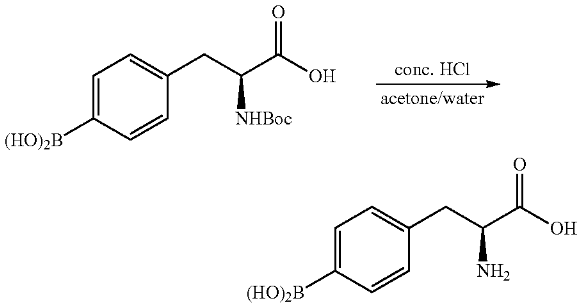

To (S)-3-(4-boronophenyl)-2-((tert-butoxycarbonyl) amino)propanoic acid (1.84 g, 5.95 mmol) obtained in Example 7, aqueous acetone (10/1, 12 mL) was added. To this suspension liquid, concentrated hydrochloric acid (1.86 g, 17.9 mmol) was added, and the mixture was heated to 55° C. The mixture was stirred for 1.5 hours, and then cooled to room temperature, and acetone was distilled off under reduced pressure. Water (59 mL) was added, and the mixture was washed with isopropyl acetate (50 mL). To the obtained aqueous phase, an aqueous sodium hydroxide solution was added dropwise to adjust the pH to 6.2, so that a solid was precipitated. The precipitate was filtered, then washed with water (50 mL) and acetone (10 mL) in this order, and dried at 60° C. under reduced pressure to obtain (S)-2-amino-3-(4-boronophenyl)propanoic acid (1.12 g, 5.36 mmol, 90%, purity >99%, >99% ee) as a white solid. (yield in two stages: 67%)

It is possible to confirm that (S)-2-amino-3-(4-boronophenyl)propanoic acid can be obtained by eliminating protecting groups, even the yield in two stages is 67%, the loss of $^{10}B$ can be reduced, and excellent results are obtained for both a purity and an enantiomeric excess.

Example 9

Production of (S)-3-(4-boronophenyl)-2-((tert-butoxycarbonyl)amino)propanoic acid

[Formula 16]

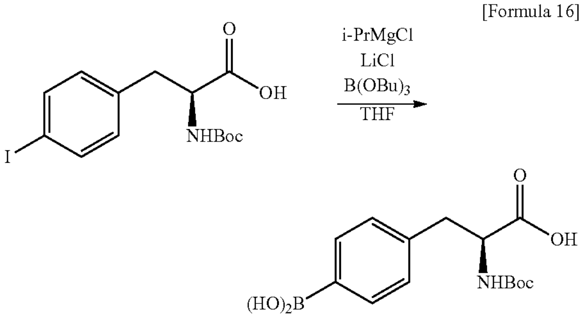

In a nitrogen atmosphere, anhydrous tetrahydrofuran (6.0 mL) was added to (S)-2-((tert-butoxycarbonyl)amino)-3-(4- iodophenyl)propanoic acid (2.35 g, 6.01 mmol) and lithium chloride (1.02 g, 24.0 mmol) dried under reduced pressure at 130° C. The mixture was cooled to −30° C., and isopropylmagnesium chloride (0.9 M tetrahydrofuran solution, 27 mL, 24 mmol) was added dropwise over 35 minutes. The mixture was stirred for 16.5 hours, and tributyl borate (2.07 g, 9.02 mmol) was then added dropwise at the same temperature. The mixture was stirred for 5 hours, and 3% hydrochloric acid (20 mL) was then added at 10° C. or lower to adjust the pH to 1. Ethyl acetate (30 mL×2) was added, the mixture was extracted, and the organic phase was then washed with saturated saline (30 mL). This was dried over anhydrous sodium sulfate, and filtered, and the obtained filtrate was then concentrated under reduced pressure. To the obtained crude product, dichloromethane (50 mL) was added to precipitate a solid, and the precipitate was then filtered, and washed with dichloromethane (50 mL). A solid was obtained, precipitation of a solid in the filtrate was confirmed, and the filtrate was further filtered. This operation was carried out twice, and the obtained solid was dried under reduced pressure at 60° C. to obtain (S)-3-(4-boronophenyl)-2-((tert-butoxycarbonyl)amino)propanoic acid (1.57 g, 5.08 mmol, 85%) as a white solid.

The method of Example 9 provided a high yield and good results.

Example 10

Production of (S)-3-(4-boronophenyl)-2-((tert-butoxycarbonyl)amino)propanoic acid

[Formula 17]

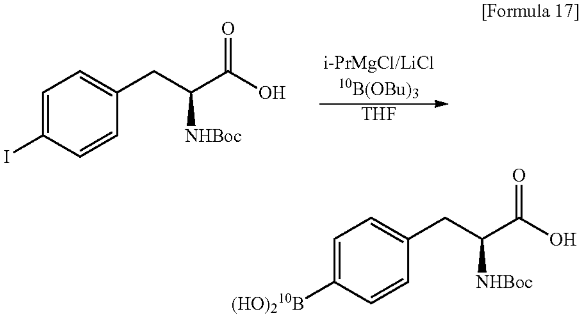

To (S)-2-((tert-butoxycarbonyl)amino)-3-(4-iodophenyl) propanoic acid (12.5 g, 32.0 mmol), tetrahydrofuran (64 mL) was added in a nitrogen atmosphere to obtain a solution. The solution was cooled to −35° C., and an isopropylmagnesium chloride-lithium chloride complex (1.3 M tetrahydrofuran solution, 98 mL, 128 mmol) was added dropwise at −30° C. or lower over 45 minutes. The mixture was stirred at −30° C. for 4 hours, and $^{10}B$ tributyl borate (7.34 g, 32.0 mmol) was then added dropwise at the same temperature. The mixture was stirred for 2 hours, and water (40 mL) was then added at 0° C. or lower. Subsequently, concentrated hydrochloric acid (about 12 mL) was added at 10° C. or lower to adjust the pH to 1. The liquid was separated, and the aqueous phase was extracted with methyl t-butyl ether (80 mL). The organic phase obtained above and the MTBE phase were combined, water (100 mL) was added, and the pH was set to 12.8 by adding an 8 M aqueous sodium hydroxide solution while cooling the mixture in an ice bath. The liquid was separated, and 3% hydrochloric acid was added to the obtained aqueous phase to adjust the pH to 10 to 11. To this, 1-butanol (60 mL×2) was added to perform washing. While the aqueous phase after the washing was cooled in an ice bath, concentrated hydrochloric acid was added dropwise to adjust the pH to about 3, so that a solid was precipitated. The precipitate was filtered, and washed with water (appropriate amount) to obtain wet crystals. Isopropanol (40 mL) was added, and the mixture was heated to 70° C. to completely dissolve the crystals. Water (120 mL) was added, and the mixture was cooled to perform recrystallization. Filtration was performed, and the obtained solid was washed with water (appropriate amount), and dried at 50° C. under reduced pressure to obtain (S)-3-(4-boronophenyl)-2-((tert-butoxycarbonyl)amino)propanoic acid (5.77 g, 18.7 mmol, 58%) as a white solid.

In this method, it was possible to efficiently perform stirring without precipitation of a solid during the exchange reaction, and it was possible to efficiently obtain an intended product at 58% with respect to $^{10}B$.

Comparative Example 4

Production of (S)-3-(4-boronophenyl)-2-((tert-butoxycarbonyl)amino)propanoic acid To (S)-2-((tert-butoxycarbonyl)amino)-3-(4-iodophenyl) propanoic acid (12.5 g, 32.0 mmol), tetrahydrofuran (64 mL) was added in a nitrogen atmosphere to obtain a solution. The solution was cooled to −35° C., and isopropylmagnesium chloride (2.0 M tetrahydrofuran solution, 64 mL, 128 mmol) was added dropwise at −30° C. or lower over 45 minutes. The mixture was stirred at −30° C. for 3 hours, a solid was precipitated and hardened, so that it was not possible to perform stirring.

When the reaction was carried out by the method of Comparative Example 4, a solid was precipitated in the reaction system, so that it was not possible to perform stirring.

What is claimed is:

1. A method for producing a compound of formula (II) from a compound of formula (I):

[Formula 1]

(I)

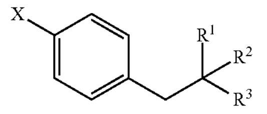

[Formula 2]

(II)

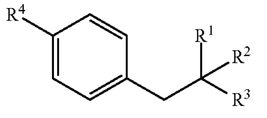

wherein, in formulas (I) and (II),

X is selected from the group consisting of Cl, F, Br and I, $R^1$ is $NR^{11}R^{12}$, $R^{11}$ is selected from the group consisting of H and a protecting group for an amino group, and $R^{12}$ is a protecting group for an amino group, $R^2$ is $COOR^{21}$, and $R^{21}$ is selected from the group consisting of H, a linear or branched C1-C10 alkyl group, and a benzyl group, $R^3$ is selected from the group consisting of H and $COOR^{31}$, and $R^{31}$ is selected from the group consisting of a linear or branched C1-C10 alkyl group and a benzyl group, and $R^4$ is selected from the group consisting of boronic acid ($B(OH)_2$), a boronic acid ester, and a boronic acid amide, the method comprising:

a first step of reacting the compound of formula (I) with a linear or branched C1-C10 alkylmagnesium halide in the presence of a metal halide at a reaction temperature in a range of −50° C. to −20° C.; and a second step of reacting the compound obtained in the first step and a boric acid ester or a boric acid amide at a reaction temperature in a range of −50° C. to −20° C., thereby producing the compound of formula (II).

2. The production method according to claim 1, in which the metal halide is lithium chloride, and the alkylmagnesium halide is selected from the group consisting of isopropylmagnesium chloride and sec-butylmagnesium chloride.

3. The production method according to claim 1, in which X is selected from the group consisting of Br and I, and $R^3$ is $COOR^{31}$, and $R^{31}$ is a linear or branched C1-C10 alkyl group.

4. The production method according to claim 1, in which X is selected from the group consisting of Br and I, and $R^2$ is COOH, and $R^3$ is H.

5. The production method according to claim 1, in which both the first step and the second step comprise using at least one solvent selected from the group consisting of an ether-based solvent and a hydrocarbon-based solvent as a solvent.

6. The production method according to claim 1, in which a mixture of a metal halide and an alkylmagnesium halide and a boric acid ester represented by $B(OR)_3$ are mixed with the compound of formula (I) to promote the reactions in the first step and the second step, wherein R is selected from the group consisting of a linear or branched C1-C10 alkyl group, a phenyl group, and a benzyl group.

7. The production method according to claim 6, in which an amount ratio between the mixture of a metal halide and an alkylmagnesium halide and the boric acid ester is 1:0.5 to 2 in terms of equivalent ratio.

8. The production method according to claim 1, the method further comprising a third step of deprotecting the compound of formula (II) obtained in the second step, thereby obtaining 4-borono-L-phenylalanine.

9. The production method according to claim 1, wherein the $R^{12}$ is tert-butoxycarbonyl.

* * * * *